(12) United States Patent
Urkowitz

(10) Patent No.: US 7,345,625 B1
(45) Date of Patent: Mar. 18, 2008

(54) RADAR POLARIZATION CALIBRATION AND CORRECTION

(75) Inventor: Harry Urkowitz, Philadelphia, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 133 days.

(21) Appl. No.: 11/237,531

(22) Filed: Sep. 28, 2005

(51) Int. Cl.
*G01S 7/40* (2006.01)

(52) U.S. Cl. ................ 342/174; 342/188; 342/159; 342/162

(58) Field of Classification Search ........ 342/159–162, 342/173, 174, 188, 361–366
See application file for complete search history.

(56) References Cited

U.S. PATENT DOCUMENTS

| | | | | |
|---|---|---|---|---|
| 4,310,813 A | * | 1/1982 | Yuuki et al. ................. | 333/117 |
| 5,157,403 A | * | 10/1992 | Urkowitz .................... | 342/111 |
| 5,173,706 A | * | 12/1992 | Urkowitz .................... | 342/99 |
| 5,376,939 A | * | 12/1994 | Urkowitz .................... | 342/134 |
| 5,583,515 A | * | 12/1996 | Marumoto .................. | 342/361 |
| 5,760,734 A | * | 6/1998 | Urkowitz .................... | 342/159 |

FOREIGN PATENT DOCUMENTS

| | | | |
|---|---|---|---|
| EP | 535957 A2 | * | 4/1993 |
| JP | 56001641 A | * | 1/1981 |

* cited by examiner

*Primary Examiner*—John B Sotomayor
(74) *Attorney, Agent, or Firm*—Duane Morris, LLP

(57) ABSTRACT

A polarimetric radar system transmits a signal which is nominally the desired polarization, but which may deviate therefrom. A calibration operation is performed using a symmetrical radar reflector, to determine the gains and phases of reception of two mutually orthogonal components of the received reflected signal which result in nulling of the two polarization components of the reflected signal. These gains and phases represent receive corrections which result in a simulation of perfect polarization purity on both transmission and reception. The corrections established during calibration are applied to the receive signals during normal (non-calibration) operation, to improve the effective polarization of the transmission and reception.

7 Claims, 5 Drawing Sheets

RADAR POLARIZATION CALIBRATION AND CORRECTION

FIELD OF THE INVENTION

This invention relates to correction of the polarization characteristics of a radar system by calibration using a standard reflector to generate calibration functions. The calibration functions are applied during normal operation to determine the polarization characteristics of noncalibration targets.

BACKGROUND OF THE INVENTION

Polarimetric radar (radar which has the ability to transmit and receive in more than one sense of polarization) has uses in weather surveillance and in air traffic control applications. It may also have applications in other areas such as ballistic missile defense. The calibration of polarimetric radars is based, at least in part, on the electromagnetic reflection characteristics of planar and spherical targets to incident circular polarization. A reflective planar target returns the opposite sense of both linear and circular polarization, and a spherical target returns the opposite hand of circular polarization relative to the incident polarization. If a radar system transmits a particular hand of circular polarization, such as right-hand circular polarization (RHCP), raindrops, which are generally spherical, will reflect left-hand circular polarization (LHCP) signals. Assuming that the same antenna is used for radar reception of the returns as for transmission (monostatic radar), or at least assuming that the receive antenna has RHCP characteristics (in a bistatic radar context), the LHCP return signal will tend to be rejected by the receive antenna. Reflection of circular polarization signals, such as RHCP signals, from nonspherical targets are more complex, and do not necessarily simply reverse the polarization, but instead tend to return noncircular elliptical polarization. Thus, an aircraft target will generate reflections in response to incident RHCP which include elliptical RHP together with mutually orthogonal linear polarizations. A RHCP reflected energy receiving antenna will not reject these reflected signals. It should be noted that mutually orthogonal linear polarizations of electromagnetic energy are often referred to as vertical (V) and horizontal (H) regardless of the actual orientation of the electric field.

In the context of weather radar, it is possible to estimate the shape of precipitation by alternately transmitting two mutually orthogonal electromagnetic signals. The return signals from hailstones, which tend to be round, differ from those of raindrops, which tend to be flattened, and these differences can be used to distinguish between hailstones and raindrops.

Thus, there are important uses for radar systems which can transmit selected circular or linear polarizations and selectively respond to particular return signal polarizations. More specifically, weather surveillance and air traffic control radar systems require various forms of polarization diversity, including (a) transmission and reception of circular polarization, (b) transmission of circular polarization and reception of orthogonal linear polarizations and (c) transmission of ±45° slant polarization and simultaneous reception of orthogonal linear polarizations. Array antennas capable of transmitting diverse polarizations are known. In such array antennas, each antenna element includes a pair of crossed linear radiating/receiving elements such as crossed or mutually orthogonal dipoles. Those skilled in the art view such crossed radiating/receiving elements as being a single elemental antenna of the array. The individual crossed radiating-receiving elements are referred to herein as "radiators" regardless of whether they are operated in a radiating or receiving mode, or both.

Unfortunately, the imperfections of antennas and real systems tend to work against the use of polarimetric radar. It is difficult, if not impossible, to make an antenna which transduces only a particular polarization to the exclusion of other polarizations, and this difficulty is compounded by the high power which a transmit antenna must handle. An aspect of this difficulty lies in the precision with which the antenna itself can be fabricated, and another aspect lies in the associated electronics, beamformers, and cables which interconnect elemental antennas of an array antenna, and especially the transmit module which is associated with antenna elements or element subgroups in an active array antenna.

One possible way to adjust the transmitted polarization in the context of an array antenna is to adjust the phase and amplitude of the signal applied to each transmit/receive radiating element of the elemental antenna relative to those of other elemental antennas, so that the polarization of the resulting combined far-field radiation, in a particular direction, meets the desired standard. It is difficult to separate out the far-field contributions of any one elemental antenna, so the correction applied to a given antenna element may be such as to cause that particular antenna element to be far from the desired polarization even though the polarization of the sum radiation is correct. This has the effect of tending to degrade the sum polarization at other aspect angles. Additionally, the correction of phase and amplitude in a phased-array antenna is ordinarily accomplished by digital adjusters, which have fairly coarse adjustment steps. The coarse steps make achieving the desired polarization more difficult than if continuous adjustment were possible. Extremely fine adjustments of amplitude and phase may be possible, but may be unacceptably expensive.

Improved polarimetric radar systems are desired.

SUMMARY OF THE INVENTION

A method according to an aspect of the invention is for compensating errors in transmitted circular polarization such that reflections from spherical objects tend to be cancelled. The method comprises the step of transmitting from an antenna an electromagnetic signal at a carrier frequency. The transmitted signal includes mutually orthogonal linear components nominally phased to generate circular polarization, but which may instead generate noncircular or elliptical polarization transmissions. The method also includes the step of receiving, by means of first and second linear radiators, first and second mutually orthogonal linear components of reflections of the transmitted signals, to thereby produce first and second received signals. A set of correction factors to the first and second received signals is procured. The correction factors are a function of (a) beam direction in the case of monostatic radar and (b) beam directions in the case of bistatic radar. These correction factors may also be a function of carrier frequency if the system operates at a plurality of frequencies. The first and second received signals are processed with the correction factors in such a fashion as to cause the received signal to appear as if substantially perfect circular polarization had been transmitted and received. In a particular mode of this method, the step of procuring a set of correction factors comprises the steps of placing a sphere to receive the transmitted signal and to reflect the reflected signal. The correction factors may be generated for a plurality of beam directions. The amplitudes and phases of the first and second received signals are adjusted to cancel the combined echoes at each of the beam directions. The amplitudes and phases at which the cancellation occurs for each beam direction are tabulated to generate the set of correction factors.

A method for determining the ellipticity of a radar target according to another aspect of the invention comprises the step of transmitting from an antenna an electromagnetic signal at a carrier frequency, where the transmitted signal includes mutually orthogonal linear components nominally phased to generate circular polarization, but which may instead generate noncircular or elliptical polarization, to thereby produce transmitted signals. The method also includes the step of receiving, by means of first and second linear radiators, first and second mutually orthogonal linear components of reflections of the transmitted signals, to thereby produce first and second received signals. A set of correction factors to the first and second received signals is procured, which correction factors are a function of (a) beam direction in the case of monostatic radar and (b) beam directions in the case of bistatic radar. If the transmitted signals are at different frequencies, the correction factors may take frequency into account. The first and second received signals are processed with the correction factors in such a fashion as to cause the received signal to appear as if substantially perfect circular polarization had been transmitted and received. The method also includes the step of receiving, from a nonspherical target, third and fourth mutually orthogonal linear components of reflections of the transmitted signals. The third and fourth received signals are processed with the correction factors to thereby generate corrected mutually orthogonal received components. The characteristics of the corrected mutually orthogonal received components are compared to determine the nonsphericity or ellipticity of the target.

Another method according to an aspect of the invention is for compensating errors in transmitted and received circular polarization. The method comprises the step of transmitting an electromagnetic signal at a carrier frequency from an antenna, to thereby produce transmitted electromagnetic signals. The transmitted electromagnetic signal includes mutually orthogonal linear components nominally phased to generate circular polarization, but which may instead generate noncircular or elliptical polarization. This method also includes the step of receiving, by means of first and second linear radiators, first and second mutually orthogonal linear components of reflections of the transmitted signals, to thereby produce first and second received signals. A set of correction factors to the first and second received signals is procured. The correction factors are a function of (a) beam direction in the case of monostatic radar and (b) beam directions in the case of bistatic radar. The correction factors may be a function of carrier frequency if the transmitted signals range over a plurality of frequencies. The first and second received signals are processed with the correction factors in such a fashion as to cause the received signal to appear as if substantially perfect circular polarization had been transmitted and received.

A method for compensating errors in transmitted andor received linear polarization according to yet another aspect of the invention comprises the steps of transmitting, from an antenna, an electromagnetic signal at a carrier frequency, which signal includes, or can be decomposed into, two mutually orthogonal linear components nominally controlled in phase and amplitude to produce linear polarization to thereby produce first and second transmitted signals. The actual phase and amplitude may be such that (a) the polarization of the transmitted nominally linearly polarized signal is at an undesired angle andor (b) the transmitted signal includes a circular component. By means of first and second linear radiators, first and second mutually orthogonal linear components of reflections of the transmitted signals are received, to thereby produce first and second received signals. A set of correction factors to the first and second received signals is procured, where the correction factors are a function of (a) beam direction in the case of monostatic radar and (b) beam directions in the case of bistatic radar. The first and second received signals are processed with the correction factors in such a fashion as to cause the received signal to appear as if (a) substantially perfect linear polarization had been transmitted and received in the desired direction. In a particular mode of this method, the step of procuring a set of correction factors comprises the steps of placing a sphere to receive the transmitted signal and reflect the reflected signal at a plurality of beam directions, adjusting the amplitudes and phases of the first and second received signals to cancel the combined echoes at each of the beam directions, and tabulating the amplitudes and phases at which the cancellation occurs for each beam direction to generate the set of correction factors. The correction factors may be a function of carrier frequency if the transmitted signals are at various frequencies.

According to a further aspect of the invention, a method for determining the nonsphericity of a radar target comprises the step of transmitting, from an antenna, an electromagnetic signal at a carrier frequency, which signal includes two mutually orthogonal linear components nominally controlled in phase and amplitude to produce linear polarization to thereby produce first and second transmitted signals. The two mutually orthogonal linear components may be such that (a) the polarization of the transmitted signal is at an undesired angle and (b) the transmitted signal includes a circular component. By means of first and second linear radiators, first and second mutually orthogonal linear components of reflections of the transmitted signals are received, to thereby produce first and second received signals. A set of correction factors to the first and second received signals is procured. The correction factors are a function of (a) beam direction in the case of monostatic radar and (b) beam directions in the case of bistatic radar. The first and second received signals are processed with the correction factors in such a fashion as to cause the received signal to appear as if substantially perfect linear polarization had been transmitted and received in the desired direction. A radar target is placed for reflection of the first and second transmitted signals, to thereby produce third and fourth received signals. The correction factors are applied to the third and fourth received signals, to thereby produce corrected third and fourth received signals. The corrected third and fourth received signals are compared to determine the nonsphericity of the radar target. The correction factors may be a function of carrier frequency if the transmitted signals are at plural frequencies.

DESCRIPTION OF THE INVENTION

Figure 1A:
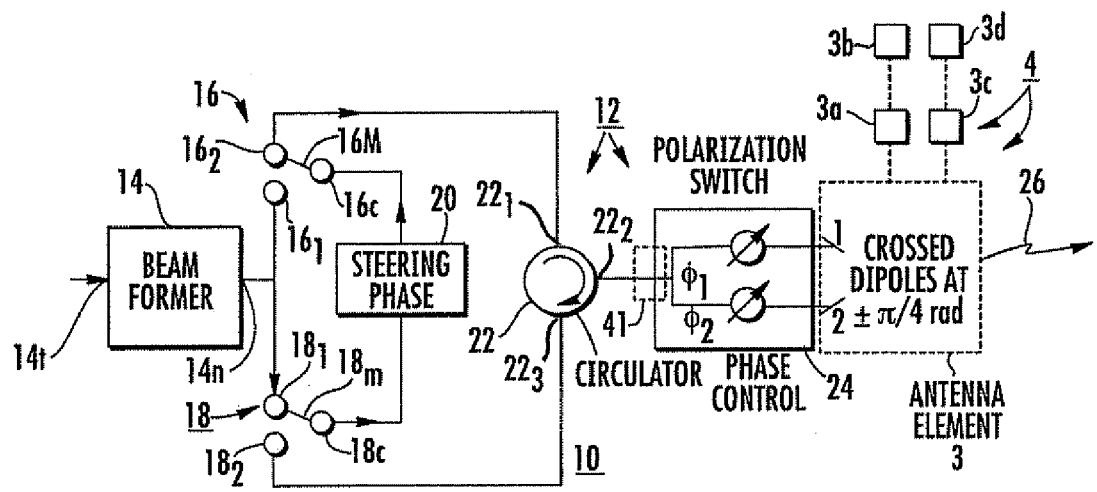
FIG. 1a is a simplified diagram in block and schematic form of a portion of a prior-art radar system in a transmit operating mode.

FIG. 1a is a simplified diagram in block and schematic form of a portion 10 of a radar system including a transmit/receive (TR or T/R) module 12 and elemental crossed (mutually orthogonal) antenna radiators 1 and 2 of an array element 3 of an array antenna designated generally as 4. Antenna array 4 also includes other array elements, some of which are illustrated as 3a, 3b, 3c, and 3d. Thus, antenna radiators 1 and 2 together make up an antenna element or elemental antenna 3 of antenna array 4. The elemental radiators may be dipoles, and for convenience in explanation they are termed dipoles, although they may be other types of linear antenna radiator elements. The physical orientation of the radiator elements 1 and 2 may be expressed as ±45°, and, looking outward, radiator dipole 1 is canted from upper left to lower right, while radiator dipole 2 is perpendicular or orthogonal to radiator dipole 1. A beamformer 14 receives signals to be transmitted at a port 14t, and distributes the signals to be transmitted to at least n ports, one of which is designated 14n. In FIG. 1a, a portion of the signal to be transmitted by antenna radiators 1 and 2 is applied from a port 14n of beamformer 14 to switches 16 and 18. More particularly, the signal to be transmitted is applied to switch terminals or electrodes $16_1$ and $18_1$, respectively. Switches 16 and 18 are represented as ganged mechanical switches, each with fixed electrodes and a movable element connected to a common electrode, as is conventional for purposes of explanation. Those skilled in the art know that electronic switches are ordinarily preferred for this purpose, and that the illustrated mechanical equivalents are only for purposes of explanation. In the arrangement of FIG. 1a, the movable element of switch 16 is designated 16m, which is shown in the "transmit" mode as connecting a switch terminal or electrode $16_2$ to common electrode 16c. Also in FIG. 1a the movable element 18m of switch 18 connects switch electrode $18_1$ to common electrode 18c. The signal applied from beamformer 14 to switch element $16_1$ goes no further for lack of a connection. The signal applied from beamformer 14 to switch element $18_1$ is coupled by switch 18 through a steering phase block 20. Steering phase block 20 adjusts the phase of the signal to be transmitted by crossed dipole radiators 1 and 2 relative to other dipole elements (not illustrated) of the array 4 to steer the transmit beam in a selected direction. The steering-phase-adjusted signal to be transmitted is coupled from steering phase block 20 and by way of movable switch element 16m to a port $22_1$ of a circulator 22. Circulator 22 circulates the steering-phase-controlled signal to be transmitted in the direction of circulation, indicated by the arrow, to a further port $22_2$ of the circulator 22.

The signal to be transmitted which leaves port $22_2$ of circulator 22 of FIG. 1a is coupled to a 3 dB power divider/combiner 41 and by individual paths within a phase control block 24 to crossed linear radiators or dipole elements 1 and 2 of antenna element 3. Block 24 is often referred to as a "polarization switch." A first path extends from circulator port $22_2$ to dipole radiator 1 and passes through a phase shifter designated $\phi_1$, and a second path extends from circulator port $22_2$ to dipole radiator 2 and passes through a phase shifter designated $\phi_2$. Phase shifters $\phi_1$ and $\phi_2$ adjust the electrical phase of the signals to be transmitted by dipole radiators 1 and 2 relative to each other. The polarization of the transmitted signal can be selected by adjustment of the phase shifters $\phi_1$ and $\phi_2$. For right circular polarization, $\phi_1-\phi_2=\pi/2$ radians; for left circular polarization, $\phi_2-\phi_1=\pi/2$ radians; for linear vertical polarization $\phi_1=\phi_2$; and for horizontal linear polarization $\phi_1=\phi_2$. Thus, control of phase shifters $\phi_1$ and $\phi_2$ allows control or selection of the polarization of the transmitted signal 26 produced by the radiation of the two dipole radiators 1 and 2. For equal amplitude radiation from radiators 1 and 2, the gain of the paths through phase shifters $\phi_1$ and $\phi_2$ of phase control 24 must be equal.

Figure 1B:
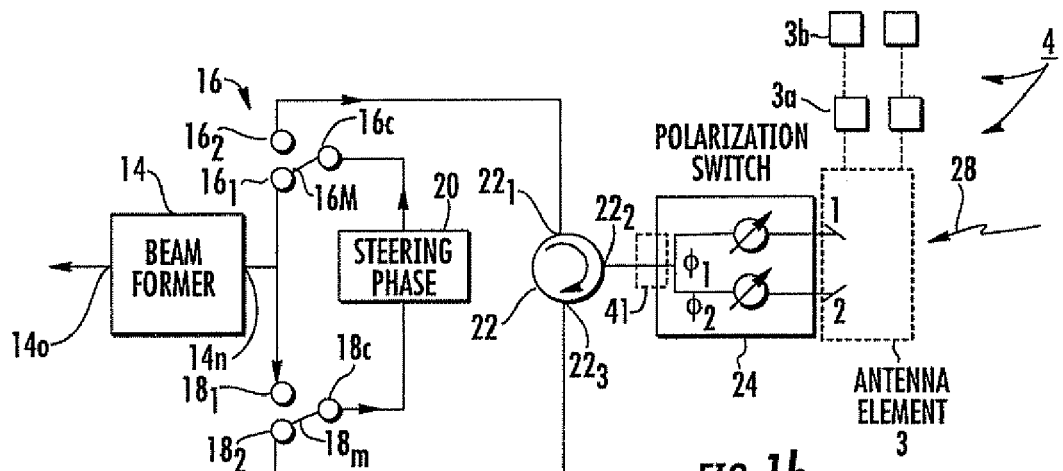
FIG. 1b is a corresponding diagram of the portion of FIG. 1a in the receive operating mode.

In the context of a monostatic radar system, the signal transmitted by the arrangement of FIG. 1, and by the overall array 4 of which antenna element 3 (radiators 1 and 2) are a part, propagates away from the array antenna 4, as known in the art, and may impinge on or be intercepted by a reflective target, such as an airplane (not illustrated). The reflective target tends to reflect the radar signal, and a portion of the reflected signal returns toward the radar system from which it originated. Those skilled in the art know that the polarization of the reflected signal depends, in part, on the polarization of the transmitted signal, and in part on the electrical characteristics of the target. FIG. 1b represents the same portion of a radar system 10 as that of FIG. 1a, but with switches 16 and 18 in the position for reception of the reflected signals.

In FIG. 1b, the movable elements 16m and 18m of switches 16 and 18 connect the switch common terminals 16c and 18c to terminals $16_1$ and $18_2$, respectively. With switches 16 and 18 in the positions illustrated in FIG. 1b, the portion 10 of the radar is arranged for reception of reflected signals 28. Radiator or dipole element 1 of FIG. 1b receives or transduces a slant +45° component of that portion of the reflected signal arriving at the radar system, and radiator or dipole element 2 receives or transduces the −45° component. These +45° and −45° components will in general be of different amplitudes and phases. The +45° component from radiator or dipole element 1 passes through phase shifter $\phi_1$ of phase control block 24, and the −45° component from radiator or dipole element 2 passes through phase shifter $\phi_2$. The phase shifters may be in the same phase condition as for transmission, in which case the array element 3, representing the combination of radiator or dipole elements 1 and 2, will respond to the same received polarization as that which was transmitted. If the phase conditions of phase shifters $\phi_1$ and $\phi_2$ are changed after transmission of the signal to be transmitted, then the antenna element 3 (combination of radiators 1 and 2) will respond to the polarization defined by the phase settings of phase shifters $\phi_1$ and $\phi_2$. In general, the phase settings of the phase shifters $\phi_1$ and $\phi_2$, together with the physical positions of radiators or dipoles 1 and 2, determine those polarizations which the arrangement of FIG. 1b will receive or accept, and those which it will reject. Power splitter/combiner 41 combines the two phase shifted received signals and applies them to port $22_2$ of circulator 22.

In the receive mode of FIG. 1b, portion 10 of the radar receives the selected polarization(s) as established by the physical positions of the radiator elements 1 and 2 and by the phase settings of phase shifters $\phi_1$ and $\phi_2$, and applies the signals to port $22_2$ of circulator 22. Circulator 22 circulates the signals in the direction of the arrow to port $22_3$. The signals exit port $22_3$ of circulator 22 and flow by way of switch terminal $18_2$, movable element 18m, and common terminal 18c to steering phase block 20. In block 20, the phase of array element 3 relative to other array elements of the array 4 is set, to thereby establish the receive beam pointing direction. The receive beam direction is often selected to be the same as the transmit beam direction. The received signals flow from steering phase adjustment block 20 to port 14n of beamformer by way of common terminal 16c, movable element 16m, and terminal $16_1$ of switch 16. The received signal is processed by the beamformer to combine the signals from all the antenna elements 3 of the entire array, as known in the art, and make the combined signals available at a port 14o.

Figure 2A:
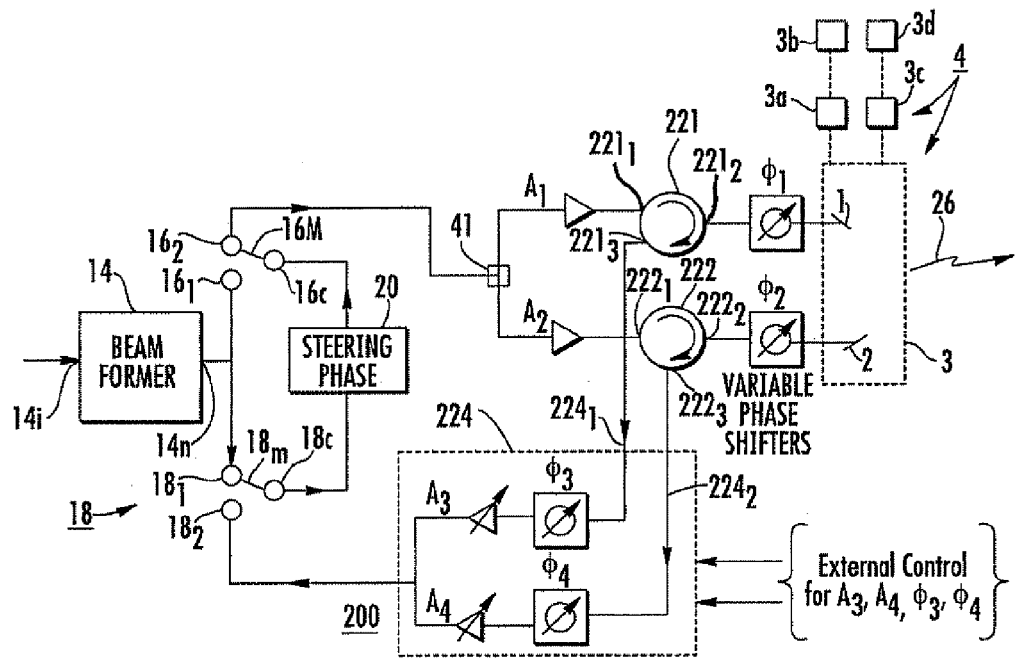
FIG. 2a is a simplified diagram in block and schematic form of a portion of a radar system according to an aspect of the invention, arranged for transmission of signals.
Figure 2B:
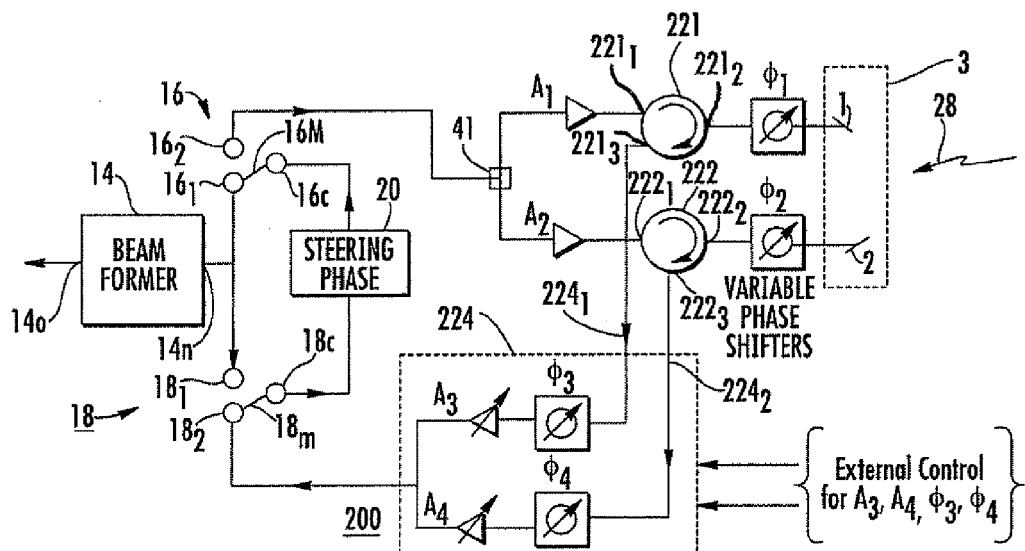
FIG. 2b is similar to FIG. 2a, but arranged for reception of reflected signal and for correction of polarization errors.

FIG. 2a is a simplified diagram in block and schematic form of a portion 200 of a radar system according to an aspect of the invention, arranged for transmission of signals, and FIG. 2b is similar to FIG. 2a, but arranged for reception of reflected signal and for correction of polarization errors. In FIG. 2a, elements corresponding to those of FIG. 1a are designated by like reference alphanumerics. In the transmit arrangement of FIG. 2a, signals from output port 14n of beamformer 14 are coupled through switch 18, steering phase block 20, and switch 16 as described in conjunction with FIG. 1a. The signals to be transmitted leave terminal $16_2$ of switch 16, are split in splitter/combiner 41 into first and second transmit portions, which proceed to the input ports of multipliers $A_1$ and $A_2$. Multipliers $A_1$ and $A_2$ adjust the amplitudes of the two transmit signal portions. The first amplitude-adjusted transmit signal portion is applied from multiplier $A_1$ to port $221_1$ of circulator 221, and the second amplitude-adjusted transmit signal portion is applied from multiplier $A_2$ to port $222_1$ of circulator 222. Circulators 221 and 222 circulate their respective first and second transmit signal portions to their ports $221_2$ and $222_2$, respectively. The first and second transmit signal portions leaving circulator ports $221_2$ and $222_2$ are applied to polarization phase control blocks $\phi_1$ and $\phi_2$, respectively. Phase control blocks $\phi_1$ and $\phi_2$ determine the polarization of the transmit signals 26 transmitted by dipole antenna elements 1 and 2 of antenna element 3.

Circulators 221 and 222 of portion 200 of the radar system of FIG. 2a in the transmit mode of operation nominally circulate no signal to their ports $221_3$ and $222_3$, respectively, but any signal received during the transmit mode of operation, and appearing at ports $221_3$ and $222_3$, are coupled to a block 224, and ultimately coupled to open switch terminal $18_2$ of switch 18, which prevents further propagation of the signal toward the beamformer 14.

In FIG. 2b the switches 16 and 18 are positioned or conditioned for reception. In the receive mode of operation, antenna radiators 1 and 2 of antenna element 3 receive mutually orthogonal components of the arriving reflected signal 28 from the target, and couple the received signal components to polarization phase shifters $\phi_1$ and $\phi_2$, which phase shift the received signal components so that the nominal polarization to which antenna elements 1 and 2 of antenna element 3 respond is the desired polarization. The two received signal components from phase shifters $\phi_1$ and $\phi_2$ are applied to ports $221_2$ and $222_2$ of circulators 221 and 222, respectively. Circulators 221 and 222 circulate the received signal components in the direction of the arrow to ports $221_3$ and $222_3$, respectively. As mentioned, the polarization of the transmitted signal may deviate from the desired polarization, and consequently the received signal may not properly represent or carry the characteristics of the radar target. According to an aspect of the invention, correction, in the form of external control signals $A_3$, $A_4$, $\phi_3$ and $\phi_4$, is applied to the received signal to compensate for errors in transmission. This correction is performed on the individual signal components received by antenna radiators 1 and 2 of antenna element 3.

In the receiving mode of the arrangement 200 of FIG. 2a, the first individual received signal component received by radiator 1 is phase shifted by phase shifter $\phi_1$ to select the nominal receive polarization, and is circulated to an input port $224_1$ of a correction block 224. Similarly, the second individual received signal component received by radiator 2 is phase shifted by phase shifter $\phi_2$ to select the nominal receive polarization, and is circulated to an input port $224_2$ of correction block 224. The first individual received signal components applied from circulator 221 to correction block 224 are applied to the cascade of a phase shifter $\phi_3$ and a multiplier or amplitude adjuster $A_3$. The second individual received signal components applied from circulator 222 to correction block 224 are applied to the cascade of a phase shifter $\phi 4$ and a multiplier or amplitude adjuster $A_4$. Thus, the received signal components can be individually adjusted in amplitude and phase independent of the amplitude and phase of the transmitted signals under the control of control signals $A_3$, $A_4$, $\phi_3$ and $\phi_4$. The corrected first and second individual received signal components are coupled to terminal $18_2$ of switch 18, and thence by way of steering phase block 20 and switch 16 to port 14n of beamformer 14. Those skilled in the art know that the beamformer 14 combines the received signals applied to its port 14n with the received signals from other antenna elements of the array, such as 3a, 3b, 3c, and 3d, to produce a combined signal for further processing.

In the receive operating mode of the portion 200 of the radar system illustrated in FIG. 2b, the first received signal component (originating from radiator 1) applied to phase shifter $\phi_3$ and multiplier or amplitude adjuster $A_3$ is corrected by phase shifts and amplitude adjustments from an external control source. The second received signal component (originating from radiator 2) applied to phase shifter $\phi_4$ and multiplier or amplitude adjuster $A_4$ is corrected by phase shifts and amplitude adjustments from an external control source. The phase and amplitude correction for the two received signal components are selected to compensate for or correct for polarization errors occurring during transmission, and also incidentally compensate for polarization errors occurring on reception. In other words, the corrections applied to correction block 224 are such as to make it seem that both the transmit and receive polarizations were or are perfect. The correction values are determined by a calibration process.

Figure 3:
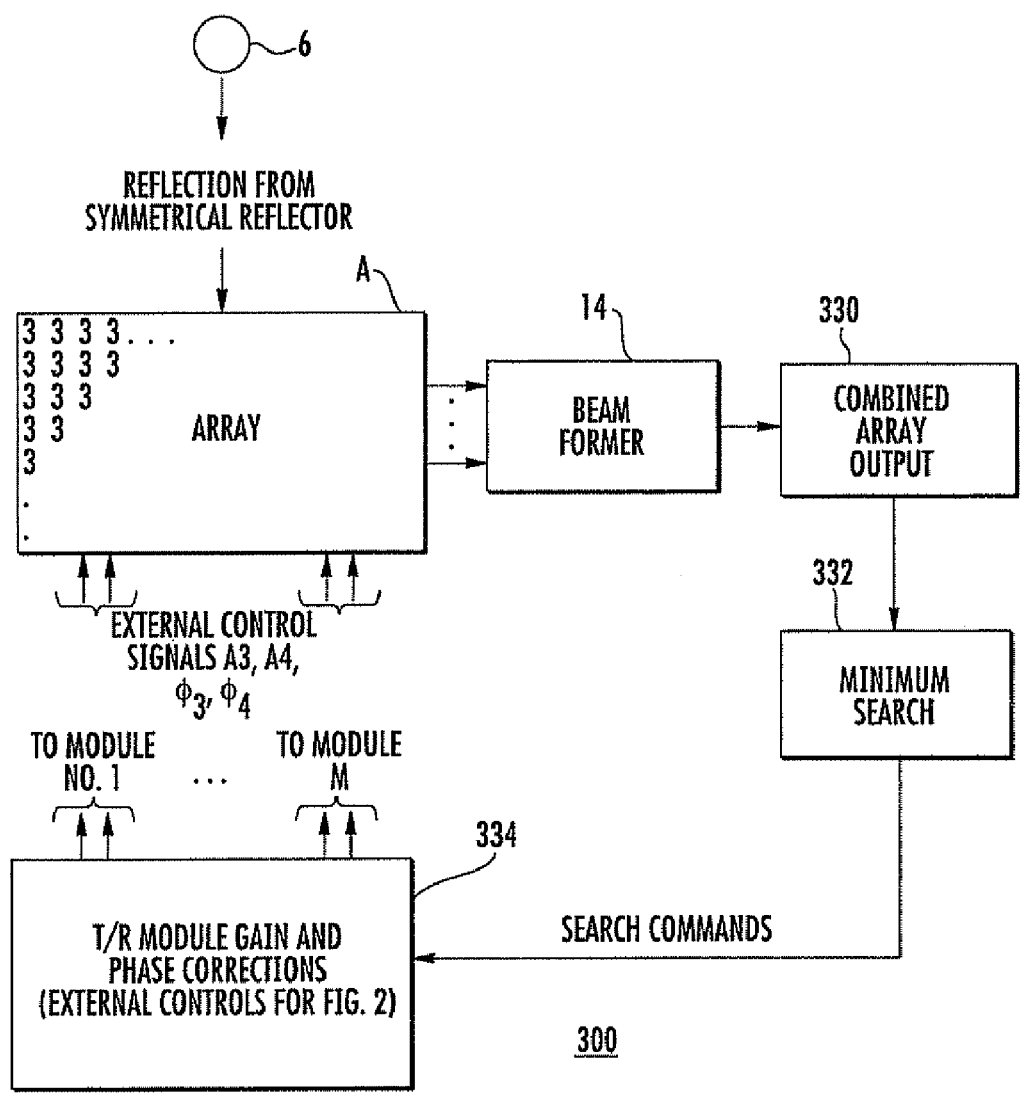
FIG. 3 illustrates the calibration apparatus for generating correction factors for the arrangement of FIG. 2b, and suggests the process by which the polarization correction factors are determined.

FIG. 3 illustrates the calibration apparatus 300 and suggests the process by which the polarization correction factors are determined for the arrangement of FIG. 2b. In short, the calibration nulls the reflected components from a symmetrical reflector 6, such as a conductive or dielectric sphere, to determine the polarization error which must be corrected. It is assumed that the radar system has transmitted a signal of a particular, nominally known polarization (as by setting $\phi_1$ and $\phi_2$ of FIG. 2a to nominal values for the desired polarization). FIG. 3 represents the operation of the radar in a receive mode to receive the symmetrically-reflected transmitted signal, with application of nominal or zero polarization correction signals $A_3$, $A_4$, $\phi_3$, $\phi_4$. The apparatus of FIG. 3 includes the array antenna A, of which antenna elements 3 are a part. The signals received from the symmetrical reflector 6 are processed with the polarization corrections set to a nominal or zero value, so that the imperfections in the received polarization may be evaluated. The beamformer couples signals to produce a combined array output 330. A processing step 332 performs a search for the values of $A_3$, $A_4$, $\phi_3$, and $\phi_4$ for each antenna element or TR module which result in mutual cancellation or nulling of the first and second received signal components. The gains and phases are varied under control of minimum search block 332 by means of any one of a number of multidimensional search procedures or methods, such as (a) gradient search, (b) multidimensional least squares, or (c) quasi-Newton minimization, described, for example, in M. A. Branch and A. Grace, *Optimization Toolbox for use with MATLAB, user's guide, Mathworks, Inc. of Natlick*, MA 1990, 1996. The search procedure produces a vector of gains and phases that produces a minimum of the array output. When nulling occurs, the first and second received signal components are known to be identical in amplitude and of mutually opposite phase. The values of $A_3$, $A_4$, $\phi_3$, and $\phi_4$ for each antenna element of the array antenna which provide the nulling for each array antenna as a whole are stored in a memory 334 for later use during normal (non-calibration) operation. The values of $A_3$, $A_4$, $\phi_3$, and $\phi_4$ are determined for each possible or potential beam direction or pointing angle. Thus, each pair of mutually orthogonal elemental antennas of the array antenna has its own particular values of $A_3$, $A_4$, $\phi_3$, and $\phi_4$ at each beam pointing direction. If the values of $A_3$, $A_4$, $\phi_3$, and $\phi_4$ are a function of operating frequency, then the values of $A_3$, $A_4$, $\phi_3$, and $\phi_4$ must additionally be tabulated for the various operating frequencies.

Normal operation of the radar can begin once the values of $A_3$, $A_4$, $\phi_3$, and $\phi_4$ which null the reflected signal components are known and stored in memory 334 of FIG. 3. The following equations must be satisfied. For right circular polarization, $$(\phi_1+\phi_3)-(\phi_2+\phi_4)=\pm\pi;\ A_1A_3=A_2A_4 \quad (1)$$

where $\phi$ represents phase shift and A represents gain
For left circular polarization, $$(\phi_1+\phi_3)+(\phi_2+\phi_4)=\pm\pi;\ A_1A_3=A_2A_4 \quad (2)$$

For vertical polarization, $$(\phi_1+\phi_3)-(\phi_2+\phi_4)=0;\ A_1A_3=A_2A_4 \quad (3)$$

For horizontal polarization, $$(\phi_1+\phi_3)+(\phi_2+\phi_4)=0;\ A_1A_3=A_2A_4 \quad (4)$$

It is possible to perform the polarization correction at the antenna element level, at the subarray level, or at the array level. Polarization correction at the antenna element level (where each antenna element consists of a pair of mutually orthogonal dipole radiators) is described in conjunction with the description of FIG. 2b. Polarization correction at the array or subarray level is described in conjunction with FIG. 4. In this type of correction, the array or subarray signals are collected, reduced to coherent digital baseband to produce digitized complex envelope, and the correction is applied to the resulting digital signals. This type of correction is advantageous in that the correction may be made very fine, limited only by the correction word length. A variant of the array or subarray level correction allows parallel and simultaneous correction of any desired polarization properties such that the effective transmissions and corresponding receptions are as though they were perfectly polarized.

Figure 4:
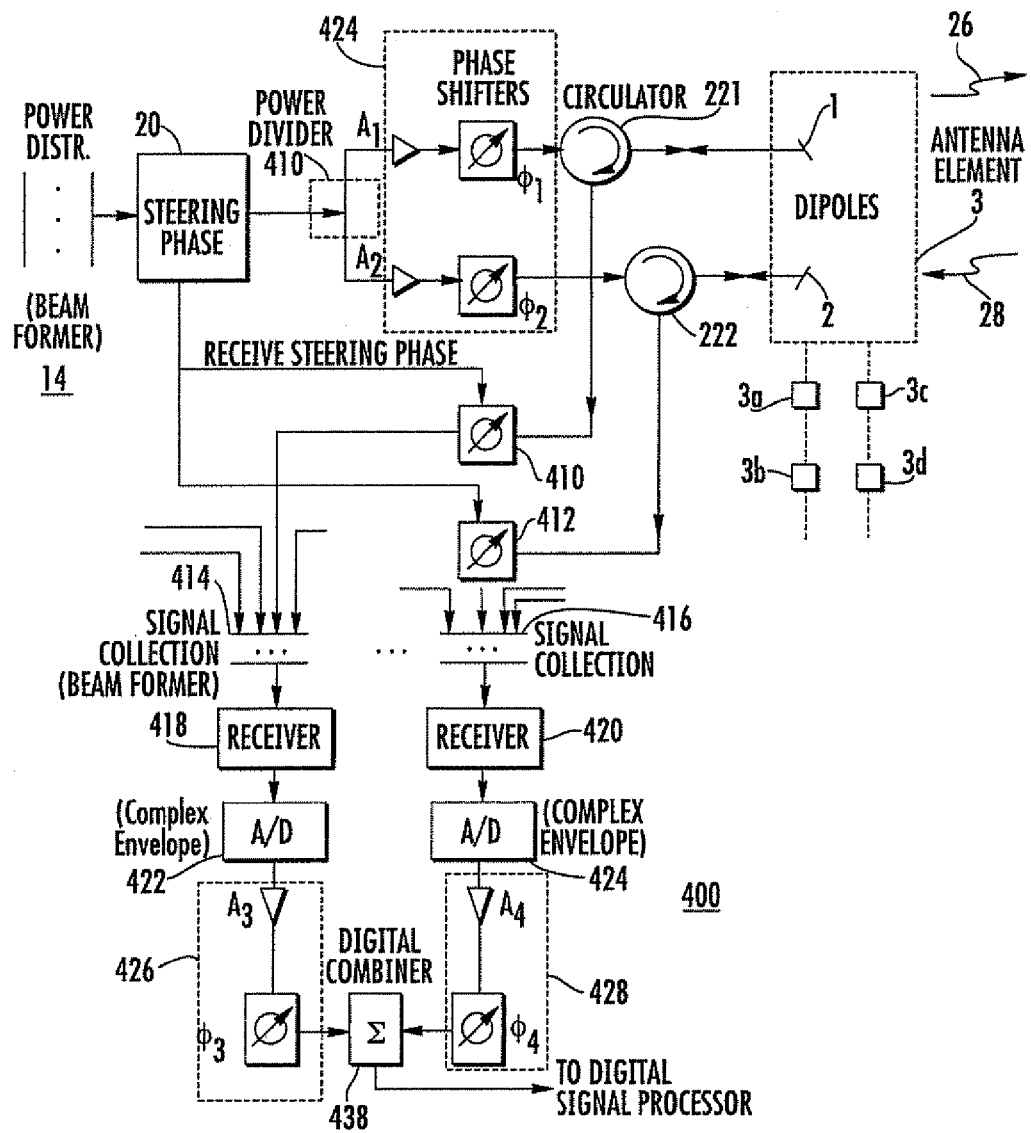
FIG. 4 is a simplified diagram in block and schematic form illustrating a portion of a radar system according to an aspect of the invention, in which separate beam steering phase is used for transmission and reception, and the received signals from each pair of mutually orthogonal linear radiators or dipoles are combined before generating digital signals and processing the digital signals to produce the desired overall receive beam polarization.

FIG. 4 is a simplified diagram in block and schematic form illustrating a portion of a radar system 400 according to an aspect of the invention, in which separate beam steering phase is used for transmission and reception, and the received signals from each pair of mutually orthogonal dipoles are combined before generating digital signals and processing the digital signals to produce the desired overall receive beam polarization FIG. 4 illustrates the application of polarization correction signals to signals collected from a plurality of elemental antennas (where an elemental antenna consists of means for separately receiving two mutually orthogonal linear polarizations). In FIG. 4, beamformer 14 is a transmit-only beamformer, unlike the corresponding beamformer of FIGS. 2a and 2b. The signal to be transmitted is applied through transmit beam steering phase block 20 and power divider 410 to a block 424, which includes multipliers or amplifiers $A_1$ and $A_2$ and phase shifters $\phi_1$ and $\phi_2$, for setting the transmit polarization to be transmitted from the antenna element 3, including radiators or dipoles 1 and 2, to produce transmitted signal 26.

In the receive mode of operation, the antenna element 3 including radiators or dipoles 1 and 2 receives signal 28, which is or are independently circulated (or switched, if switches are used instead of circulators) by way of a pair of paths to phase shifters 410 and 412. The values or settings of phase shifters 410 and 412 are selected to be the same as the steering phase imposed by block 20, so as to steer the receive beam in the same direction as the transmit beam. The steering phase must be applied independently to each path to maintain equal receive signal phase characteristics. The steering-phase-corrected received signals from phase shifters 410 and 412 are applied to signal collectors 414 and 416, respectively, which correspond to receive beamformers (or possibly sub-beamformers), collecting the steering-phase-corrected signals from a antenna elements, such as elements 3a, 3b, 3c, and 3d distributed over the radar antenna array. The beamforming characteristics may be the same as those of the transmit beamformer 14, to thereby provide receive beam characteristics generally similar to those of the transmit beam. The outputs of signal collectors 414 and 416 are collected received signals from antenna element 3 and other antenna elements of the array antenna 4.

The corrected received signals from signal collectors 414 and 416 of FIG. 4 are expected to have sufficiently high signal-to-noise ratio for proper processing. The corrected received signals from collectors 414 and 416 are applied to receivers 418 and 420, respectively, which downconvert the signals to intermediate frequency or baseband, and which may also amplify the signal. The downconverted or baseband signals from receivers 418 and 420 are converted to coherent digital form (two baseband components) for processing in analog-to-digital converters (A/D or ADC) 422 and 424, respectively. The digitized baseband received signals appearing at the outputs of A/Ds 422 and 424 are applied to polarization correction blocks 426 and 428, respectively. Within blocks 426 and 428, amplitude correction multipliers $A_3$ and $A_4$ are set to the correction values for the receive beam pointing direction, and phase shifters $\phi_3$ and $\phi_4$ are set to the phase correction values for the receive beam pointing direction and the desired polarization.

Finally, digital combiner 438 combines the phase-corrected values to produce the desired polarization characteristics in the receive mode. It should be noted that the calibration values for the arrangement of FIG. 4, being based on summed received signals rather than on individual received signals, may be different from those used in the arrangement of FIG. 2b.

Figure 5:
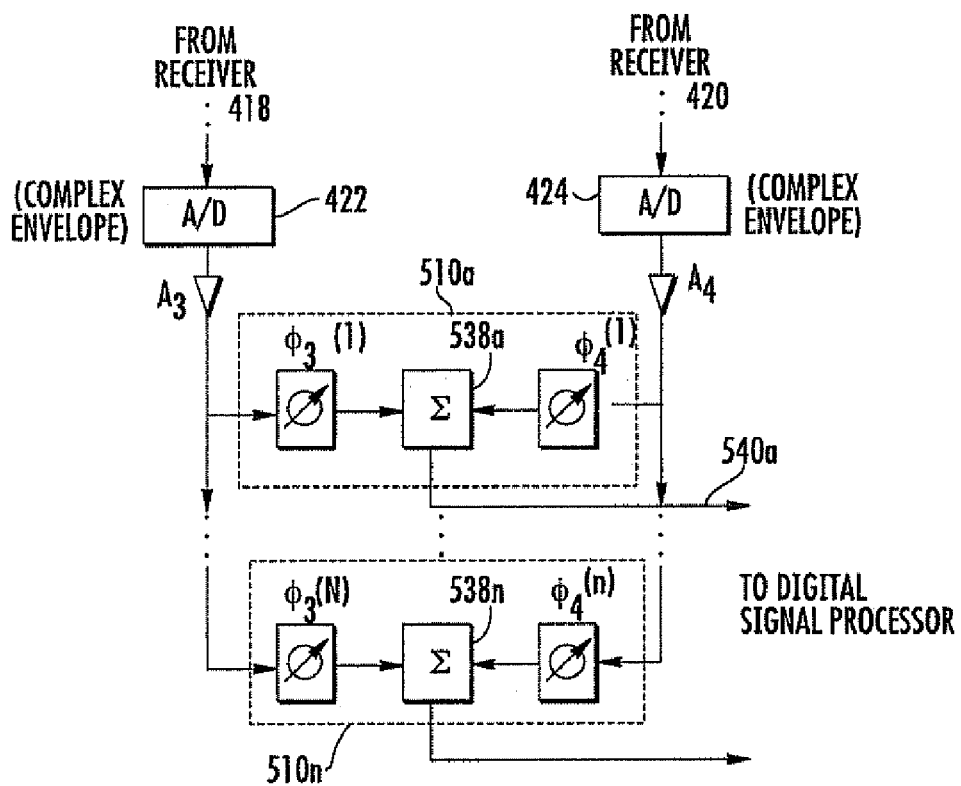
FIG. 5 is a simplified diagram in block and schematic form according to another aspect of the invention, in which several receive polarizations can be simultaneously achieved.

FIG. 5 represents a portion of the arrangement of FIG. 4, modified to have additional correctors to simultaneously provide diverse desired receive polarizations. In FIG. 5, elements corresponding to those of FIG. 4 are designated by the same alphanumerics. In FIG. 5, only one pair of amplitude correctors $A_3$ and $A_4$ is necessary. The outputs of amplifiers or multipliers $A_3$ and $A_4$ are applied by way of buses to a plurality of phase-corrector/summer blocks, two of which are illustrated as 510a and 510n. Each of the phase-corrector/summer blocks includes a phase shifter connected to the output of amplifier $A_3$, and another phase shifter connected to the output of amplifier $A_4$. The outputs of the phase shifters of each phase-corrector/summer block are connected to a summing (Σ) circuit which sums the two applied phase-shifted signals to produce a digital output signal representing the reception of signal at the desired polarization. Thus, phase-corrector/summer block 510a includes a phase shifter $\phi_3^{(1)}$ having its input port coupled to the output of amplifier $A_3$ and its output connected to an input port of summing circuit 538a, and another phase shifter $\phi_4^{(1)}$ having its input port coupled to the output of amplifier $A_4$ and its output connected to a second input port of summing circuit 538a, for generating a signal on path 540a representing one of RHCP reception, LHCP reception, +45° linear, or −45°, or any other polarization. Similarly, phase-corrector/summer block 510n includes a phase shifter $\phi_3^{(n)}$ having its input port coupled to the output of amplifier $A_3$ and its output connected to an input port of summing circuit 538n, and another phase shifter $\phi_4^{(n)}$ having its input port coupled to the output of amplifier $A_4$ and its output connected to a second input port of summing circuit 538n, for generating a signal on path 540n representing another polarization. These signals representing various receive polarizations occur simultaneously.

Simultaneous achievement of several polarizations or polarization components from the arrangement of FIG. 5 requires that the values of $A_3$, $A_4$, $\phi_3^{(1)}$ and $\phi_4^{(1)}$ satisfy equations (1), (2), (3), and (4), and that the values of $A_3$, $A_4$, $\phi_3^{(n)}$, and $\phi_4^{(n)}$ also satisfy equations (1), (2), (3), and (4).

The beam steering direction selection during normal operation of the polarization-calibrated radar system also aids or contributes to selection of the correction factors for the selected beam direction.

A major advantage of the polarization correction method according to an aspect of the invention is that the phase and amplitude controls are executed in the receive portion of the radar system, which operates at low power relative to the transmit portion of the radar. This also tends to reduce the need for tight specifications on the transmit polarization because the correction can be made upon reception.

It should be noted that while horn, flat-plate or spherical reflectors can be used to calibrate monostatic radar, only an isotropic reflector, such as a sphere, can be used for calibration of bistatic or multistatic radars.

Those skilled in the art know that many variants of the illustrated arrangements are possible. For example, radio-frequency (RF) switches may be used instead of circulators in the arrangements of FIGS. 2a and 2b. While the antenna elements of the array antenna have been described as dipoles, other types of antennas can be used, so long as on reception they transduce linear components of the received signal. While the minimization technique may not be capable of complete nulling of the radiation from the calibration reflector, reasonable nulling should still be sufficient to provide improvement in the polarization operation.

A method according to an aspect of the invention is for compensating errors in transmitted circular polarization such that reflections from spherical objects (6) tend to be cancelled. The method comprises the step of transmitting from an antenna (1,2;3;4) an electromagnetic signal (26) at a carrier frequency. The transmitted signal (26) includes mutually orthogonal linear components nominally phased to generate circular polarization, but which may instead generate noncircular or elliptical polarization transmissions. The method also includes the step of receiving, by means of first (1) and second (2) linear radiators, first and second mutually orthogonal linear components of reflections of the transmitted signals (26), to thereby produce first and second received signals. A set of correction factors ($A_3$, $A_4$, $\phi_3$ and $\phi_4$) to the first and second received signals is procured. The correction factors ($A_3$, $A_4$, $\phi_3$ and $\phi_4$) are a function of (a) beam direction in the case of monostatic radar and (b) beam directions in the case of bistatic radar. These correction factors ($A_3$, $A_4$, $\phi_3$ and $\phi_4$) may also be a function of carrier frequency if the system operates at a plurality of frequencies. The first and second received signals are processed with the correction factors ($A_3$, $A_4$, $\phi_3$ and $\phi_4$) in such a fashion as to cause the received signal to appear as if substantially perfect circular polarization had been transmitted and received. In a particular mode of this method, the step of procuring a set of correction factors ($A_3$, $A_4$, $\phi_3$ and $\phi_4$) comprises the steps of placing a sphere (6) to receive the transmitted signal (26) and to reflect the reflected signal (28). The correction factors ($A_3$, $A_4$, $\phi_3$ and $\phi_4$) may be generated for a plurality of beam directions. The amplitudes and phases of the first and second received signals are adjusted to cancel the combined echoes at each of the beam directions. The amplitudes and phases at which the cancellation occurs for each beam direction are tabulated to generate the set of correction factors ($A_3$, $A_4$, $\phi_3$ and $\phi_4$).

A method for determining the ellipticity of a radar target according to another aspect of the invention comprises the step of transmitting from an antenna (1,2;3;4) an electromagnetic signal at a carrier frequency, where the transmitted signal includes mutually orthogonal linear components nominally phased to generate circular polarization, but which may instead generate noncircular or elliptical polarization, to thereby produce transmitted signals (26). The method also includes the step of receiving, by means of first (1) and second (2) linear radiators, first and second mutually orthogonal linear components of reflections (28) of the transmitted signals (26), to thereby produce first and second received signals. A set of correction factors ($A_3$, $A_4$, $\phi_3$ and $\phi_4$) to the first and second received signals is procured, which correction factors ($A_3$, $A_4$, $\phi_3$ and $\phi_4$) are a function of (a) beam direction in the case of monostatic radar and (b) beam directions in the case of bistatic radar. If the transmitted signals are at different frequencies, the correction factors ($A_3$, $A_4$, $\phi_3$ and $\phi_4$) may take frequency into account. The first and second received signals are processed with the correction factors ($A_3$, $A_4$, $\phi_3$ and $\phi_4$) in such a fashion as to cause the received signal (28) to appear as if substantially perfect circular polarization had been transmitted and received. The method also includes the step of receiving, from a nonspherical target, third and fourth mutually orthogonal linear components of reflections (28) of the transmitted signals (26). The third and fourth received signals are processed with the correction factors ($A_3$, $A_4$, $\phi_3$ and $\phi_4$) to thereby generate corrected mutually orthogonal received components. The characteristics of the corrected mutually orthogonal received components are compared to determine the nonsphericity or ellipticity of the target.

Another method according to an aspect of the invention is for compensating errors in transmitted and received circular polarization. The method comprises the step of transmitting an electromagnetic signal (26) at a carrier frequency from an antenna (1,2;3;4), to thereby produce transmitted electromagnetic signals. The transmitted electromagnetic signal (26) includes mutually orthogonal linear components nominally phased to generate circular polarization, but which may instead generate noncircular or elliptical polarization. This method also includes the step of receiving, by means of first and second linear radiators, first and second mutually orthogonal linear components of reflections (28) of the transmitted signals (26), to thereby produce first and second received signals. A set of correction factors ($A_3$, $A_4$, $\phi_3$ and $\phi_4$) to the first and second received signals is procured. The correction factors ($A_3$, $A_4$, $\phi_3$ and $\phi_4$) are a function of (a) beam direction in the case of monostatic radar and (b) beam directions in the case of bistatic radar. The correction factors ($A_3$, $A_4$, $\phi_3$ and $\phi_4$) may be a function of carrier frequency if the transmitted signals range over a plurality of frequencies. The first and second received signals are processed with the correction factors ($A_3$, $A_4$, $\phi_3$ and $\phi_4$) in such a fashion as to cause the received signal to appear as if substantially perfect circular polarization had been transmitted and received.

A method for compensating errors in transmitted andor received linear polarization according to yet another aspect of the invention comprises the steps of transmitting, from an antenna (1,2;3;4), an electromagnetic signal at a carrier frequency, which signal includes, or can be decomposed into, two mutually orthogonal linear components nominally controlled in phase and amplitude to produce linear polarization to thereby produce first and second transmitted signals. The actual phase and amplitude may be such that (a) the polarization of the transmitted nominally linearly polarized signal is at an undesired angle andor (b) the transmitted signal includes a circular component. By means of first (1) and second (2) linear radiators, first and second mutually orthogonal linear components of reflections (28) of the transmitted signals (26) are received, to thereby produce first and second received signals. A set of correction factors ($A_3$, $A_4$, $\phi_3$ and $\phi_4$) to the first and second received signals is procured, where the correction factors ($A_3$, $A_4$, $\phi_3$ and $\phi_4$) are a function of (a) beam direction in the case of monostatic radar and (b) beam directions in the case of bistatic radar. The first and second received signals are processed with the correction factors ($A_3$, $A_4$, $\phi_3$ and $\phi_4$) in such a fashion as to cause the received signal to appear as if (a) substantially perfect linear polarization had been transmitted and received in the desired direction. In a particular mode of this method, the step of procuring a set of correction factors ($A_3$, $A_4$, $\phi_3$ and $\phi_4$) comprises the steps of placing a sphere to receive the transmitted signal and reflect the reflected signal at a plurality of beam directions, adjusting the amplitudes and phases of the first and second received signals to cancel the combined echoes at each of the beam directions, and tabulating the amplitudes and phases at which the cancellation occurs for each beam direction to generate the set of correction factors ($A_3$, $A_4$, $\phi_3$ and $\phi_4$). The correction factors ($A_3$, $A_4$, $\phi_3$ and $\phi_4$) may be a function of carrier frequency if the transmitted signals are at various frequencies.

According to a further aspect of the invention, a method for determining the nonsphericity of a radar target comprises the step of transmitting, from an antenna (1,2;3;4), an electromagnetic signal at a carrier frequency, which signal includes two mutually orthogonal linear components nominally controlled in phase and amplitude to produce linear polarization to thereby produce first and second transmitted signals. The two mutually orthogonal linear components may be such that (a) the polarization of the transmitted signal is at an undesired angle and (b) the transmitted signal includes a circular component. By means of first (1) and second (2) linear radiators, first and second mutually orthogonal linear components of reflections of the transmitted signals are received, to thereby produce first and second received signals. A set of correction factors ($A_3$, $A_4$, $\phi_3$ and $\phi_4$) to the first and second received signals is procured. The correction factors ($A_3$, $A_4$, $\phi_3$ and $\phi_4$) are a function of (a) beam direction in the case of monostatic radar and (b) beam directions in the case of bistatic radar. The first and second received signals are processed with the correction factors ($A_3$, $A_4$, $\phi_3$ and $\phi_4$) in such a fashion as to cause the received signal to appear as if substantially perfect linear polarization had been transmitted and received in the desired direction. A radar target, which may be nonspherical, is placed for reflection of the first and second transmitted signals, to thereby produce third and fourth received signals. The correction factors ($A_3$, $A_4$, $\phi_3$ and $\phi_4$) are applied to the third and fourth received signals, to thereby produce corrected third and fourth received signals. The corrected third and fourth received signals are compared to determine the nonsphericity of the radar target. The correction factors ($A_3$, $A_4$, $\phi_3$ and $\phi_4$) may be a function of carrier frequency if the transmitted signals are at plural frequencies.

What is claimed is:

1. A method for compensating errors in transmitted circular polarization such that reflections from spherical objects tend to be cancelled, said method comprising:
   transmitting from an antenna an electromagnetic signal at a carrier frequency, which signal includes mutually orthogonal linear components nominally phased to generate circular polarization, but which may instead generate noncircular elliptical polarization, to thereby produce transmitted signals;
   receiving, by means of first and second linear antennas, first and second mutually orthogonal linear components of reflections of said transmitted signals, to thereby produce first and second received signals;
   procuring a set of correction factors to the first and second received signals, which correction factors are a function of (a) beam direction in the case of monostatic radar and (b) beam directions in the case of bistatic radar;
   processing said first and second received signals with said correction factors in such a fashion as to cause the received signal to appear as if substantially perfect circular polarization had been transmitted and received.

2. A method according to claim 1, wherein said step of procuring a set of correction factors comprises the steps of:
   placing a sphere to receive said transmitted signal and reflect said reflected signal at a plurality of beam directions;
   adjusting the amplitudes and phases of said first and second received signals to cancel the combined echoes at each of said beam directions; and
   tabulating said amplitudes and phases at which said cancellation occurs for each beam direction to generate said set of correction factors.

3. A method for determining the ellipticity of a radar target, said method comprising the steps of:
- transmitting from an antenna an electromagnetic signal at a carrier frequency, which signal includes mutually orthogonal linear components nominally phased to generate circular polarization, but which may instead generate noncircular elliptical polarization, to thereby produce transmitted signals;
- receiving, by means of first and second linear antennas, first and second mutually orthogonal linear components of reflections of said transmitted signals, to thereby produce first and second received signals;
- procuring a set of correction factors to the first and second received signals, which correction factors are a function of (a) beam direction in the case of monostatic radar and (b) beam directions in the case of bistatic radar;
- processing said first and second received signals with said correction factors in such a fashion as to cause the received signal to appear as if substantially perfect circular polarization had been transmitted and received; and
- receiving from a nonspherical target third and fourth mutually orthogonal linear components of reflections of said transmitted signals;
- processing said third and fourth received signals with said correction factors to thereby generate corrected mutually orthogonal received components; and
- comparing the characteristics of said corrected mutually orthogonal received components to determine the nonsphericity of said target.

4. A method for compensating errors in transmitted and received circular polarization, said method comprising:
- transmitting from an antenna an electromagnetic signal at a carrier frequency, which signal includes mutually orthogonal linear components nominally phased to generate circular polarization, but which may instead generate noncircular elliptical polarization, to thereby produce transmitted signals;
- receiving by means of first and second linear antennas first and second mutually orthogonal linear components of reflections of said transmitted signals, to thereby produce first and second received signals;
- procuring a set of correction factors to the first and second received signals, which correction factors are a function of carrier frequency, and a function of (a) beam direction in the case of monostatic radar and (b) beam directions in the case of bistatic radar;
- processing said first and second received signals with said correction factors in such a fashion as to cause the received signal to appear as if substantially perfect circular polarization had been transmitted and received.

5. A method for compensating errors in transmitted andor received linear polarization, said method comprising the steps of:
- transmitting from an antenna an electromagnetic signal at a carrier frequency, which signal includes two mutually orthogonal linear components nominally controlled in phase and amplitude to produce linear polarization, but which may be at a phase or amplitude such that (a) the polarization of the transmitted signal is at an undesired angle and (b) the transmitted signal includes a circular component, to thereby produce first and second transmitted signals;
- receiving by means of first and second linear antennas first and second mutually orthogonal linear components of reflections of said transmitted signals, to thereby produce first and second received signals;
- procuring a set of correction factors to the first and second received signals, which correction factors are a function of carrier frequency, and a function of (a) beam direction in the case of monostatic radar and (b) beam directions in the case of bistatic radar;
- processing said first and second received signals with said correction factors in such a fashion as to cause the received signal to appear as if (a) substantially perfect linear polarization had been transmitted and received in the desired direction.

6. A method according to claim 5, wherein said step of procuring a set of correction factors comprises the steps of:
- placing a sphere to receive said transmitted signal and reflect said reflected signal at a plurality of beam directions;
- adjusting the amplitudes and phases of said first and second received signals to cancel the combined echoes at each of said beam directions; and
- tabulating said amplitudes and phases at which said cancellation occurs for each beam direction to generate said set of correction factors.

7. A method for determining the nonsphericity of a radar target, said method comprising the steps of:
- transmitting from an antenna an electromagnetic signal at a carrier frequency, which signal includes two mutually orthogonal linear components nominally phased to produce linear polarization, but which may be at a phase which such that (a) the polarization of the transmitted signal is at an undesired angle and (b) the transmitted signal includes a circular component, to thereby produce first and second transmitted signals;
- receiving by means of first and second linear antennas first and second mutually orthogonal linear components of reflections of said transmitted signals, to thereby produce first and second received signals;
- procuring a set of correction factors to the first and second received signals, which correction factors are a function of carrier frequency, and a function of (a) beam direction in the case of monostatic radar and (b) beam directions in the case of bistatic radar;
- processing said first and second received signals with said correction factors in such a fashion as to cause the received signal to appear as if (a) substantially perfect linear polarization had been transmitted and received in the desired direction;
- placing said radar target for reflection of said first and second transmitted signals, to thereby produce third and fourth received signals;
- applying said correction factors to said third and fourth received signals, to thereby produce corrected third and fourth received signals; and
- comparing said corrected third and fourth received signals to determine the nonsphericity of said radar target.

* * * * *